US008595289B2

(12) United States Patent
Nandlall et al.

(10) Patent No.: US 8,595,289 B2
(45) Date of Patent: Nov. 26, 2013

(54) CLOUD PHONE WITH DISTRIBUTED PROCESSING

(75) Inventors: Vishwamitra Nandlall, McKinney, TX (US); Haseeb Akhtar, Garland, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 341 days.

(21) Appl. No.: 12/960,842

(22) Filed: Dec. 6, 2010

(65) Prior Publication Data

US 2012/0072481 A1 Mar. 22, 2012

Related U.S. Application Data

(60) Provisional application No. 61/384,757, filed on Sep. 21, 2010, provisional application No. 61/389,953, filed on Oct. 5, 2010.

(51) Int. Cl.
*G06F 15/16* (2006.01)

(52) U.S. Cl.
USPC .......................................................... 709/203

(58) Field of Classification Search
USPC .......................................................... 709/203
See application file for complete search history.

(56) References Cited

U.S. PATENT DOCUMENTS

| | | | | |
|---|---|---|---|---|
| 7,095,854 | B1 * | 8/2006 | Ginter et al. ................... | 380/233 |
| 2003/0145044 | A1 * | 7/2003 | Raivisto et al. ............... | 709/203 |
| 2006/0031852 | A1 * | 2/2006 | Chu et al. ....................... | 719/320 |
| 2007/0198656 | A1 * | 8/2007 | Mazzaferri et al. ........... | 709/218 |
| 2007/0226795 | A1 * | 9/2007 | Conti et al. ..................... | 726/22 |
| 2009/0282095 | A1 | 11/2009 | Alami et al. | |
| 2011/0041063 | A1 * | 2/2011 | Lee et al. ....................... | 715/733 |
| 2011/0177803 | A1 * | 7/2011 | Hans et al. ..................... | 455/418 |
| 2012/0015644 | A1 * | 1/2012 | Danford et al. ............... | 455/419 |
| 2012/0036248 | A1 * | 2/2012 | Naqvi et al. ................... | 709/223 |
| 2012/0254762 | A1 * | 10/2012 | Parmar et al. ................. | 715/736 |
| 2012/0259778 | A1 * | 10/2012 | Banerjee et al. ............... | 705/43 |
| 2012/0260111 | A1 * | 10/2012 | Tarkoma ....................... | 713/300 |
| 2013/0054820 | A1 * | 2/2013 | Reisman ....................... | 709/227 |
| 2013/0117359 | A1 * | 5/2013 | Husain et al. ................. | 709/203 |
| 2013/0166716 | A1 * | 6/2013 | Safari et al. ................... | 709/223 |

OTHER PUBLICATIONS

Kaefer, G. et al. Adaptive Power Aware Remote Processing—A Step Towards Power Aware Middleware. Performance, Computing and Communications; 2004 IEEE International Conference. Apr. 15, 2004.

Kaefer, G. et al. Architectural Software Power Estimation Support for Power Aware Remote Processing. Parallel and Distributed Computing Systems; Proceedings for the 14$^{th}$ IASTED International Conference. Nov. 1, 2002.

(Continued)

*Primary Examiner* — Asad Nawaz
*Assistant Examiner* — Syed S Ali

(57) ABSTRACT

A system and method for transferring application-specific functionality from a mobile handset to a wireless network associated with the mobile handset. A network component of the system communicates with a virtual copy of the mobile application on behalf of the handset while the handset is not actively using the application and performs any necessary application execution on behalf of the handset. The network component transfers execution back to the handset when the handset resumes active use of the mobile application.

12 Claims, 6 Drawing Sheets

(56) References Cited

OTHER PUBLICATIONS

Rudenko, A. et al. The Remote Processing Framework for Portable Computer Power Saving. Applied Computing 2002; Proceedings of the 2002 ACM Symposium on Applied Computing. Feb. 1, 1999.

Han, et al. Energy Saving of Mobile Devices Based on Component Migration and Replication in Pervasive Computing. Ubiquitous Intelligence and Computing; Third International Conference, UIC 2006.

* cited by examiner

CLOUD PHONE WITH DISTRIBUTED PROCESSING

CROSS-REFERENCE TO RELATED APPLICATIONS

This application claims the priority benefit under 35 U.S.C. §119(e) of U.S. Provisional Application No. 61/384,757 filed Sep. 21, 2010, and U.S. Provisional Application No. 61/389,953 filed Oct. 5, 2010, the disclosures of which are incorporated herein by reference in their entireties.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to management of mobile applications. More particularly, and not by way of limitation, the present invention is directed to a system and method to distribute processing of mobile applications between a mobile handset and carrier network.

Mobile or wireless handsets—popularly known as "cell phones" or "smartphones"—are becoming a permanent fixture in today's human communication environment because of the flexibility and mobility afforded by the wireless communication. With ever-advancing technology affording more and more power and utility, today's mobile handsets significantly dwarf those of just a few years ago in utility, functionality, compactness, and ergonomically-attractive designs. However, despite increasing design sophistication and processing power, mobile handsets remain unable to satisfy heavy processing/resource demands of today's advanced mobile applications (e.g., gaming, graphics, and multimedia applications) residing in mobile handsets or downloaded by users of the handsets.

It appears that at least the following two traits are becoming prevalent in today's mobile application domain: (1) In order to deliver optimum user experience, applications are demanding more and more CPU (Central Processing Unit) processing capacity in the mobile handset to satisfy their insatiable desire for enhanced graphics and multimedia presentation. (2) Additionally, "chatty" applications—i.e., those applications that require frequent communications (via carrier network) with their external servers even though the user is not actively using them—are taking a strong foothold among the new generation of smartphones (e.g., iPhone™, Android™, Blackberry™, etc.). These advances in mobile application functionalities have the undesirable side-effect of creating undue pressure on the capacity of the mobile (carrier) network as well as on the battery life of mobile handsets.

These problems have not gone unnoticed: but the existing solutions appear short-term oriented. For example, the following methods are being tried by the mobile network operators and mobile handset vendors: (1) The operators are trying to restrict the applications that the users can download into their handsets, (2) The operators are considering to charge additional money for the "chatty" applications (such as presence or location tracking applications; data feeds of audio/video or other contents, etc.). (3) The handset vendors are trying to focus on getting faster and better processors into their devices. However, these approaches fail to provide a long term solution because it may be difficult (and sometimes not "user friendly") for the operators to police the application usage of its mobile customers and, in case of handset vendors, the advances in processor technology may not be capable of keeping up with the mobile usage demand. It therefore appears that the future generation of smartphones may continue to play catch-up to the demand side of the equation as soon as the phones are upgraded to the newest processors.

SUMMARY

As mentioned above, explosive growth in today's multimedia, gaming, and graphics applications in mobile handsets place heavy demands on processing resources of handset processor and on the capacity of communication channels of the operator network. Current solutions to tackle these resource-hungry applications have fallen short of providing a long-term solution to the effects on energy resources of the handsets employing ever-faster processors and the pressures on the radio channel capacity of mobile networks from the ever-growing popularity of these mobile applications. Reliance on restrictions on usage may not be an effective, long-term solution, and may even prove paradoxical, especially when today's mobile handset vendors and network operators themselves encourage design of handset-specific sophisticated applications and tout the wireless broadband capacity of the network as marketing tools to attract potential subscribers/buyers.

It is therefore desirable to devise a methodology and a long-term solution to address the growing demands—on handset processing power and network communication resources—of modern applications designed for mobile usage, without the need to place any usage or monetary restrictions on the users of mobile handsets and without sacrificing advanced functionalities afforded by the applications. It is further desirable to have a solution that can be implemented without significant disruption to existing architecture or functionality of the mobile network, and without the need to rely on more processing power from mobile handsets whenever newer, more-sophisticated applications appear on the horizon.

The present invention provides a cloud phone approach as a solution to the above-mentioned problems. In one embodiment of the present invention, application-specific functionality is transferred from the mobile handset to the carrier network. The network component of the cloud phone communicates with a virtual copy of the handset-resident application on behalf of the handset while the handset is in a "dormant" state (i.e., when the handset is not actively using the application) and performs any necessary application execution on behalf of the handset, relieving the handset from continuously using its processor (and, hence, energy) resources. The network component of the cloud, phone transfers the application session back to the handset as soon as the handset starts to actively use the application again.

In one embodiment, the present invention is directed to a method of transferring application-specific functionality from a mobile handset to a wireless network associated with the mobile handset. The method includes the steps of creating a virtual instance of a mobile application using a network-based processor that is in wireless communication with the mobile handset via the wireless network, wherein the mobile application resides in the mobile handset and is configured to be executed thereby; monitoring usage of the mobile application in the mobile handset using the network-based processor; and upon detecting absence of a first active usage of the mobile application in the mobile handset, performing, using the network-based processor, application-specific functionality on behalf of the mobile handset for the mobile application using the virtual instance thereof.

In another embodiment, the present invention is directed to a mobile handset that comprises a first processor that is configured to wirelessly communicate with a second processor via a wireless network associated with the mobile handset. The second processor is external to the mobile handset and is operatively coupled to the wireless network. The mobile handset also comprises a mobile application, and a program code. The mobile application is to be executed by the first processor. The program code, when executed by the first processor, causes the first processor to: (i) register the mobile application with the second processor, (ii) continue to perform application-specific functionality for the mobile application, and (iii) discontinue performance of the application-specific functionality and transfer a most recent state of the mobile application to the second processor when requested thereby so as to allow the second processor to perform the application-specific functionality on behalf of the first processor for the mobile application using the most recent state thereof.

In another embodiment, the invention is directed to a data processing module that comprises a first program code, and a second program code. The first program code is configured to reside in a mobile handset and to be executed by a first processor in the mobile handset. The second program code, on the other hand, is configured to be executed by a second processor external to the mobile handset and operatively coupled to a wireless network associated with the mobile handset, wherein the second processor is in wireless communication with the first processor through the wireless network. The first program code, when executed by the first processor, causes the first processor to: (i) register with the second processor a mobile application residing in the mobile handset and configured to be executed by the first processor, and (ii) discontinue performance of application-specific functionality for the mobile application and transfer a most recent state of the mobile application to the second processor when requested thereby. The second program code, when executed by the second processor, causes the second processor to use the most recent state of the mobile application to perform the application-specific functionality for the mobile application on behalf of the first processor.

In a further embodiment, the invention relates to a system that comprises a mobile handset having a mobile application residing therein and configured to be executed thereby. The system further comprises a processor located external to the mobile handset and operatively coupled to a wireless network associated with the mobile handset, wherein the processor is configured to wirelessly communicate with the mobile handset via the wireless network. The system also comprises a control unit in communication with the mobile handset and the processor via the wireless network. The control unit is configured to determine whether execution of at least a portion of the mobile application be transferred from the mobile handset to the processor (e.g., to reduce energy consumption of the mobile handset).

The selective transfer of application-specific functionality from the mobile handset to the carrier network according to one embodiment of the present invention allows the network operators to offer rich graphic- and multimedia-based contents to its mobile users without placing any restrictions on their usage. The present invention also reduces the pressure on a carrier network's RAN (Radio Access Network) capacity by moving execution of "chatty" applications (which require frequent communications with their servers) from the mobile handset to the network-based component of the cloud phone. Furthermore, the present invention saves the battery life of a mobile handset because the background traffic for a handset-based mobile application is managed by the network component of the cloud phone when the user is not actively using the application.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of wireless networks as well (e.g., a corporate-wide wireless data network, a satellite communication network, etc.).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form.

It is noted at the outset that the terms "coupled;" "connected", "connecting," "electrically connected," etc., are used interchangeably herein to generally refer to the condition of being electrically connected. Similarly, a first entity is considered to be in "communication" with a second entity (or entities) when the first entity is electrically sends and/or receives (whether through wireline or wireless means) information signals (whether containing voice information or non-voice data information) to the second entity regardless of the type (analog or digital) of data signals. It is further noted that various figures (including component diagrams) shown and discussed herein are for illustrative purpose only, and are not drawn to scale.

Figure 1:
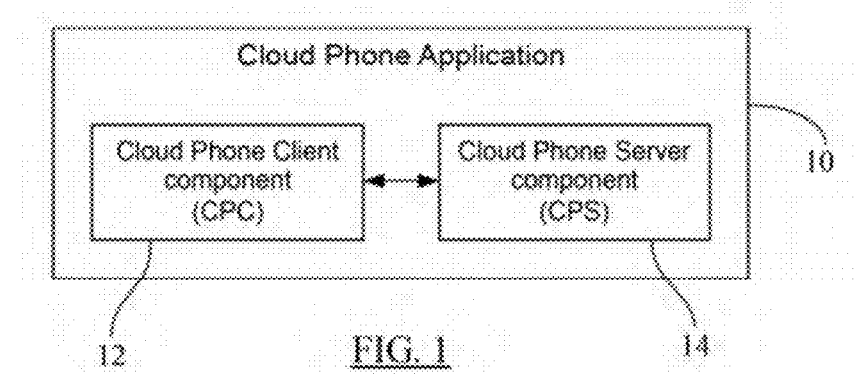
FIG. 1 illustrates constituent components of a cloud phone application according to an exemplary embodiment of the present invention.

FIG. 1 illustrates constituent components of a cloud phone (CP) application 10 according to an exemplary embodiment of the present invention. The cloud phone application may be a software module having various distributed data processing functionalities discussed later hereinbelow with reference to FIGS. 2-4, 6, and 7. As discussed in more detail hereinbelow, some portion of data processing or computations may be performed locally in a mobile handset whereas some other portion of data processing may be performed on a remote server. The CP application 10 according to one embodiment of the present invention may include a CP client component (CPC) 12 and a CP server component (CPS) 14. The CPC and CPS components may be in bi-directional communication (preferably wireless, as discussed below with reference to FIG. 2) with each other, and may together perform selective execution of a mobile application as discussed later hereinbelow. It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism.

Figure 2:
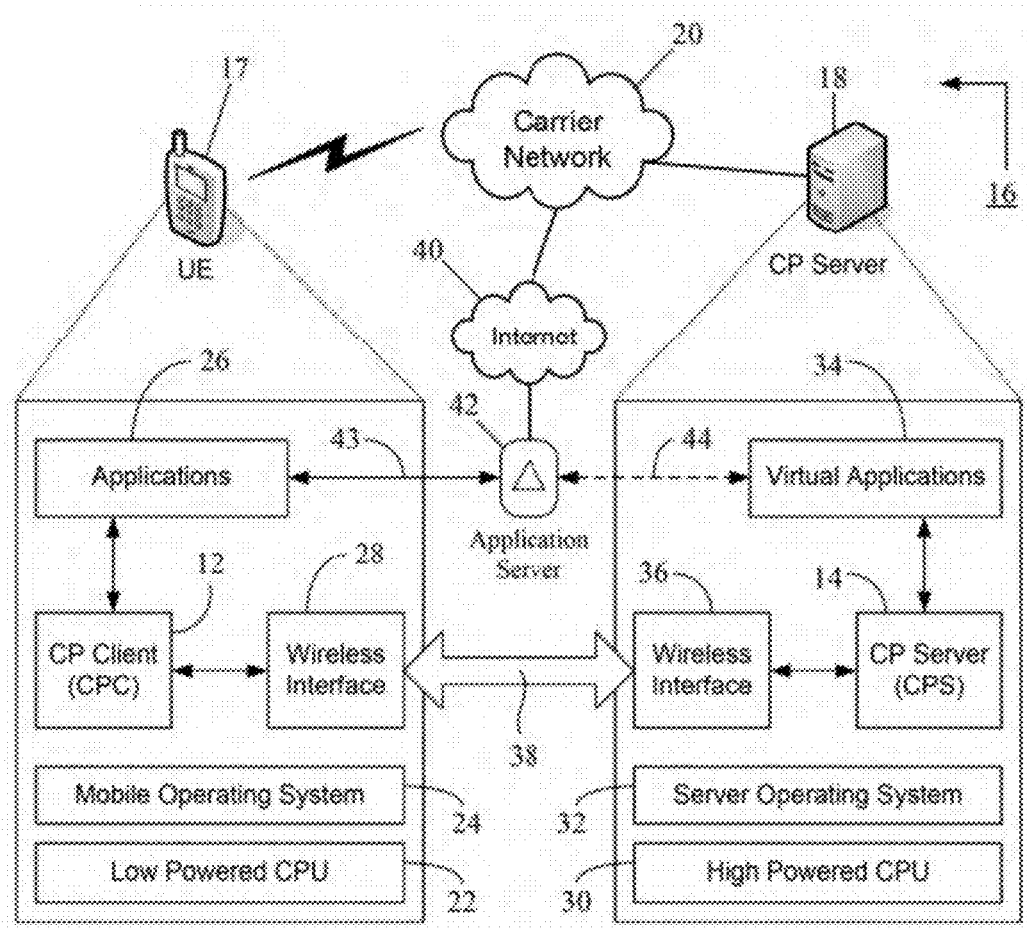
FIG. 2 depicts an exemplary system for implementing the cloud phone (CP) application according to one embodiment of the present invention.

FIG. 2 depicts an exemplary system 16 for implementing the cloud phone (CP) application 10 according to one embodiment of the present invention. The system 16 may include a mobile handset 17 that is in wireless communication with a server 18 via a carrier network 20 of a wireless service provider. The cloud phone client component (CPC) 12 may reside in the mobile handset 17, whereas the cloud phone server component (CPS) 14 may reside at the server 18 as shown in FIG. 2. It is noted here that the terms "mobile handset," "wireless handset," and "user equipment (UE)" may be used interchangeably hereinbelow to refer to a wireless communication device that is capable of voice and/or data communication via a wireless carrier network. Some examples of such mobile handsets include cellular telephones or data transfer equipments, and smartphones (e.g., iPhone™, Android™, Blackberry™, etc.). Similarly, the terms "wireless network" or "carrier network" may be used interchangeably hereinbelow to refer to a wireless communication network (e.g., a cellular network) facilitating voice and/or data communication between two user equipments (UE). It is observed here that, for ease of discussion, the server 18 may be referred to as "cloud phone server" or "CP server." However, the server 18 may not have to be a separate server (in hardware or software form) dedicated to carry out the CP functionality. In one embodiment, the functionality of the CP server 18 may be implemented in an already-existing physical server unit or (non-physical) server software (not shown) in the core of the carrier network 20. A similar discussion of such an implementation is provided with reference to FIG. 8 discussed later hereinbelow.

As shown in FIG. 2, the UE 17 may include, inside its housing (not shown), a relatively low-powered processing unit or CPU 22 executing a mobile operating system (or mobile OS) (e.g., Symbian™ OS, Palm™ OS, Windows Mobile™, Android™, etc.). Because of the battery-powered nature of mobile handsets, the CPU 22 may be designed to conserve battery power and, hence, may not be as powerful as a full-functional computer or server CPU. As further shown in FIG. 2, in addition to the CPC module 12, the UE 17 may also have one or more mobile applications 26 resident therein. These mobile applications 26 are software modules that may have been pre-packaged with the handset 17 or may have been downloaded by a user into the memory (not shown) of the UE 17. Some mobile applications 26 may be more user-interactive applications (e.g., a mobile game of chess to be played on the UE 17, a face recognition program to be executed by UE 17, etc.), whereas some other mobile applications may be significantly less user-interactive in nature (e.g., UE presence or location tracking applications). The mobile applications 26 are executed by the processor 22 under the control of the mobile operating system 24. As also shown in FIG. 2, the UE 17 may further include a wireless interface unit 28 to facilitate UE's wireless communication with the CP server 18 (discussed later below) via wireless communication channels/bands provided by the carrier network 20 associated with the UE 17.

In the embodiment of FIG. 2, the CP server 18 is shown to include a relatively high powered CPU 30 executing a server operating system 32 (e.g., Windows™, Mac™ OSX, Linux, etc.). In addition to the CPS module 14, the CP server 18 may also store in its memory (not shown) "copies" or "virtual" applications 34 (as discussed below) corresponding to the mobile applications 26 residing in the UE 17. These virtual applications 34, along with a virtualization layer (e.g., VMware® Hypervisor, Citrix® XEN Server, etc.) discussed with reference to FIG. 10 below, allow the server 18 to perform application-specific functionality on behalf of the UE 17 when needed, so as to save the battery life of the UE 17 and to also reduce the data traffic in the network 20 as discussed in more detail later hereinbelow. The server 18 may wirelessly communicate with the UE 17 via its own wireless interface unit 36. The interface units 28, 36 may wirelessly transfer data or information between the UE 17 and the CP server 18 using the signalling scheme of the underlying wireless technology (e.g., UMTS (Universal Mobile Telecommunications System) of 3GPP (Third Generation Partnership Project), GPRS (General Packet Radio Service) of GSM (Global System for Mobile communications), 3GPP LTE (Long Term Evolution), etc.) of the carrier network 20. Thus, in operation, a UE-generated signal may be wirelessly sent (using the wireless interface 28) to the carrier network 20, which, in turn, can transfer the signal to the CP server 18 for further processing by its CPU 30. Any response or other signal from the CP server 18 can be provided in the UE-recognized wireless format by the server's wireless interface 36 and eventually delivered to UE's wireless interface 28 (and, hence, to the UE's processor 22 for further processing) via the carrier network 20. The resulting wireless "link" between the interfaces 28 and 36 is symbolically illustrated by a bi-directional arrow 38. It is observed here that the CP server 18 may be coupled to the carrier network 20 via a wired or wireless connection (whether circuit-switched or packet-switched).

The carrier network 20 may be a cellular telephone network in which the UE 17 may be a subscriber unit. However, as mentioned before, the present invention is operable in other non-cellular wireless networks as well (whether voice networks, data networks, or both). Furthermore, portions of the carrier network 20 may include, independently or in combination, any of the present or future wireline or wireless communication networks such as, for example, the PSTN (Public Switched Telephone Network), or a satellite-based communication link. Similarly, the carrier network 20 may be connected to the Internet 40 (e.g., via a packet-switched connection) or may include a portion of the Internet 40 as part thereof.

In FIG. 2, an application server (AS) 42 is shown connected to the Internet 40 to provide application-specific data and processing functionality for the mobile applications 26 residing in the wireless handset 17. The AS 42 may be hosted and maintained by a third party not affiliated with the operator of the carrier network 20. The AS 42 may be accessed by the carrier network 20 (via the Internet 40) when data execution or processing requests are received from the UE 17 running the mobile applications 26 or when application-specific data is to be sent to the UE 17. For example, when a user (not shown) is playing an interactive mobile game of chess on the UE 17 with another user (not shown) on the Internet, the underlying mobile application 26 offering the game functionality may frequently need to access the AS 42 to receive the information about the most-recent move made by the user's opponent, or to transmit user's actions to the AS 42 for the eventual delivery to the user's opponent. The resulting bi-directional communication between an application 26 and its AS 42 is symbolically represented by the link 43. It is observed here that although a single AS 42 is illustrated in FIG. 2, there may be more application servers (e.g., application-specific servers not shown in FIG. 2) that may serve the mobile applications 26 via the Internet 40. Furthermore, as also symbolically represented by the dotted bi-directional link 44, the "virtual" applications 34 on the CP server 18 may similarly access the AS 42 when they are executed (as discussed in more detail below).

Figure 3:
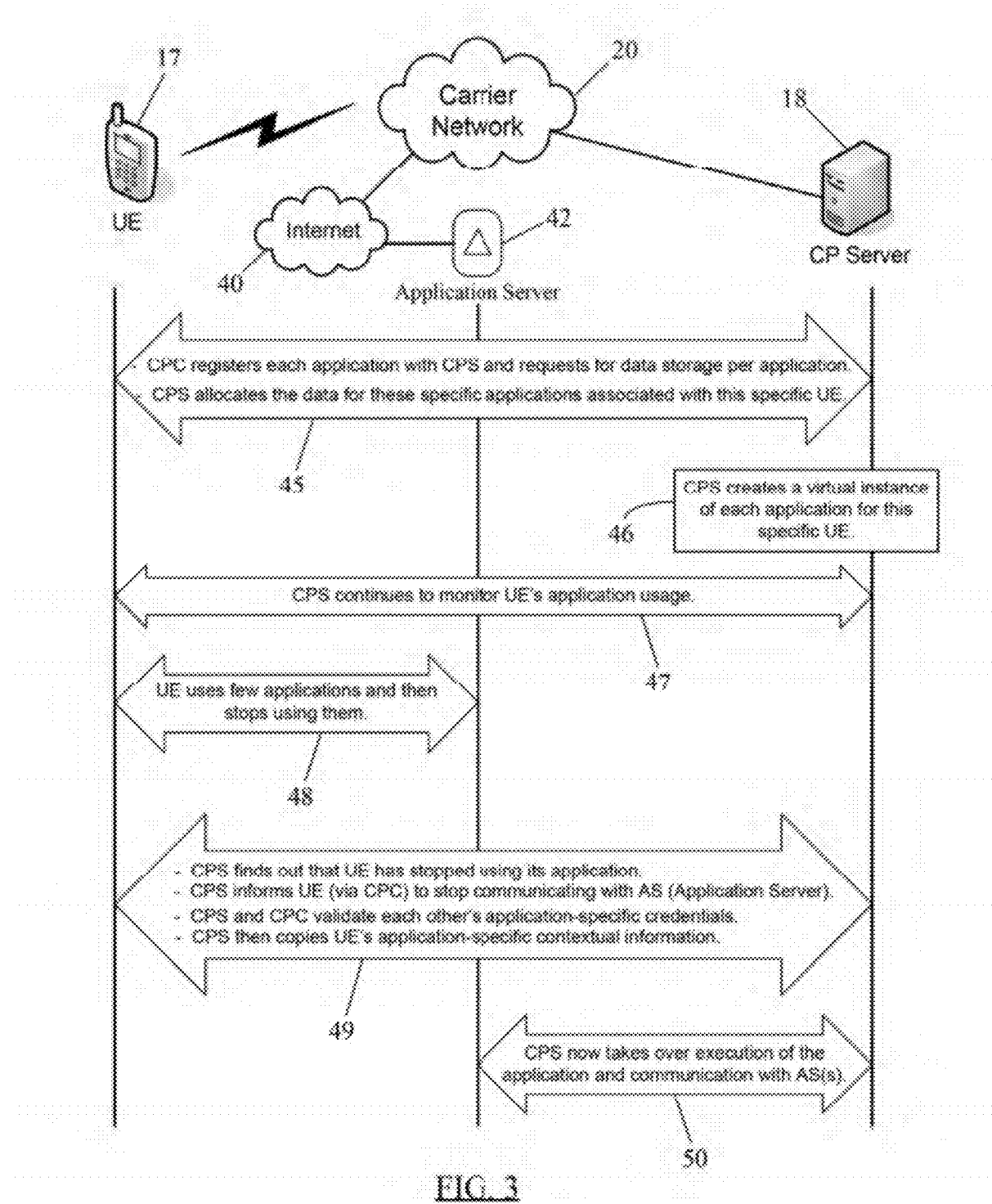
FIG. 3 shows an exemplary sequence of interactions between the client (CPC) and server (CPS) components of the cloud phone application as part of transferring execution of at least a portion of a mobile application to the CPS according to one embodiment of the present invention.

FIG. 3 shows an exemplary sequence of interactions between the client (CPC) and server (CPS) components 12 and 14, respectively, of the cloud phone application 10 as part of transferring execution of at least a portion of a mobile application to the CPS 14 according to one embodiment of the present invention. Various elements (e.g., the UE 17, the carrier network 20, the CP server 18, etc.) of system 16 in FIG. 2 are shown at the top of FIG. 3 merely to illustrate which element(s) interact for a given event. Initially, at event 45, the CPC 12 may register each mobile application 26 with the CPS 14 and request for appropriate data storage for each application, and the CPS 14, in turn, may allocate the requested data storage (e.g., in the memory (not shown) of the CP server 18) to each registered mobile application associated with this specific UE 17. In case of mobile applications pre-loaded with the UE 17, such registration may take place when the user (not shown) first activates the mobile handset 17 in the carrier network 20. In case of a mobile application downloaded by the user after activation of the handset 17, such registration may take place at the time of such download or later when the user attempts to first use the application. The registration may take place at some other time (e.g., when a user actually runs an application) than the events described herein. As part of the registration, the CPC 12 may provide a copy of the application to the CPS 14 to be stored as a virtual application 34 in the CP server 18. In one embodiment, as part of the registration process, the CPC 12 may synchronize with the CPS 14 one or more of the following: (i) any changes in the program/software content of the mobile application, (ii) any changes in the execution state of the mobile application, and (iii) application-specific contextual information for the mobile application. However, one or more of such additional tasks may be performed later (e.g., as shown with reference to event 49).

As illustrated in block 46, after registration, the CPS 14 may create a virtual instance of each mobile application (i.e., the virtual application 34 now residing in the CP server 18) specific to a given UE (here, the UE 17) from which execution of at least a portion of a mobile application may be transferred to the CP server 18. This virtual instance may be accessible by the CPC 12 at an appropriate time (e.g., at event 53 discussed below with reference to FIG. 4) upon presenting proper "credentials" to the CPS 14. Because the CPS 14 may be handling application execution on behalf of many different mobile handsets in the network 20, it may be desirable to assign UE-specific credentials to each CPC and task-specific credentials to each instance of CPS 14 associated with a given CPC to facilitate seamless data transfer and application execution for each UE. For example, in one embodiment, at the time of registration, the CPS 14 may assign a combination of two ID's to the CPC 12—one ID specific to the UE 17 and one ID specific to a mobile application 26—for each mobile application 26 handled by the CPC 12. The CPC 12 may later present this combination of ID's to the CPS 14, when needed, to establish its "credentials" and identify itself with the CPS 14. Similarly, at the time of registration, the CPS 14 may generate unique application-specific ID for each mobile application 26 handled by the CPC 12 and may inform the CPC 12 of these ID's. At run time, the CPS 14 may further generate additional execution-specific ID for a virtual instance of a mobile application 26 and present it in combination with the earlier application-specific ID as part of its "credentials" to accurately link the mobile application execution with the correct CPC 12 and the correct UE 17.

In an embodiment where a copy of a mobile application 26 is not registered already with the CPS 14, the CPS 14 may create a handset-specific copy of that mobile application (being executed by the mobile handset 17) as part of creating the virtual instance of the mobile application. In another embodiment, creation of a virtual instance of each mobile application 26 may include replication of functionality of the mobile handset 17 so as to have a "copy" of the mobile handset 17 in the CP server 18. Also, in an embodiment where data allocation is not performed earlier, the CPS 14 may allocate application-specific data storage as well for each mobile application as part of creating the virtual instance of that application.

As noted with reference to event 45 in FIG. 3, the CPS 14 will allocate enough data storage for each mobile application 26 to run that specific application in the network on behalf of the UE 17 as discussed below. After the registration, the CPS 14 may continue to monitor application usage of the UE 17 as illustrated by event 47. The CPS 14 may perform periodic synchronization of application state with the CPC 12 to determine whether the application is in fact actively used by a user of the UE 17. Alternatively, the CPC 12 may be configured to provide such synchronization at pre-determined time intervals or on-demand by the CPS 14 as shown, for example, in FIG. 6 and discussed later hereinbelow. The user of the UE 17 or the UE itself (e.g., in case of self-executing applications such as location-tracking software) may actively use a few applications and then stop using them (as indicated at event 48 in FIG. 3). It is noted here that for ease of discussion, the terms "UE" and "user" may be used interchangeably herein to identify the "actor" using or not using a mobile application 26.

It is noted here that a mobile application 26 may not be "actively" used when a user is not actually interacting with the features or functionalities provided by the application, or has "closed" the application (although the application may be still performing some tasks in the background as, for example, in case of a location-tracking application), or is using the application features irregularly (or intermittently). Such non-active usage may be interchangeably considered as "non-usage" of the application, but may not necessarily mean non-execution of the application. For example, in case of a mobile chess application, the user may be waiting to input his/her move, which may place the application usage in a kind of "idle" state until the user input is received. However, the UE's processor 22 may still need to continue to perform various task executions (or move calculations) in anticipation of user's pending move or in response to a user's most-recent move. Thus, in such a situation, it may be beneficial to transfer these processing tasks to the CP server 14 to conserve energy at the UE 17 (by idling its CPU 22 from performing these tasks).

In one embodiment, the CPC 12 may allow the processor 22 to continue executing mobile applications 26 or perform other application-specific functionalities until requested otherwise by the CPS 14. As illustrated at event 49, when the CPS 14 determines that the UE 17 has stopped using a specific mobile application 26, the CPS 14 may inform the UE 17 (e.g., the processor 22 in the UE 17) via the CPC 12 to stop communicating with the application's server (i.e., the AS 42). The CPS 14 and the CPC 12 may then validate each other's application-specific credentials (which may have been established earlier as discussed above) before performance of application-specific functionality is transferred to the CPS 14. After successful validation of credentials, the CPS 14 may copy (from the CPC 12) UE's application-specific contextual information (e.g., most recent application state, current set of data being processed by the application, etc.) to enable the CPS 14 to seamlessly continue application execution from the point the execution was stopped by the UE's processor 22. As indicated at event 50, the CPS 14 may now take over the application session to perform application-specific functionality. In one embodiment, performance of application-specific functionality may include executing at least a portion of a mobile application 26 and/or communicating with the AS 42 (e.g., to retrieve data for the application, or to report status of application execution, etc.) associated with the mobile application 26. If application-specific contextual information has not been made available to the CPS 14 earlier, the CPS 14 may copy such application-specific contextual information for the mobile application 26 from the mobile handset 17 as part of performing application-specific functionality at event 50. In other words, at event 50, the CPS 14 starts performing application-specific functionality on behalf of the UE 17, thereby saving UE's processor 22 usage (and, hence, UE's energy consumption) and/or UE's network access (and, hence, relieving pressure on the capacity of the network 20).

Figure 4:
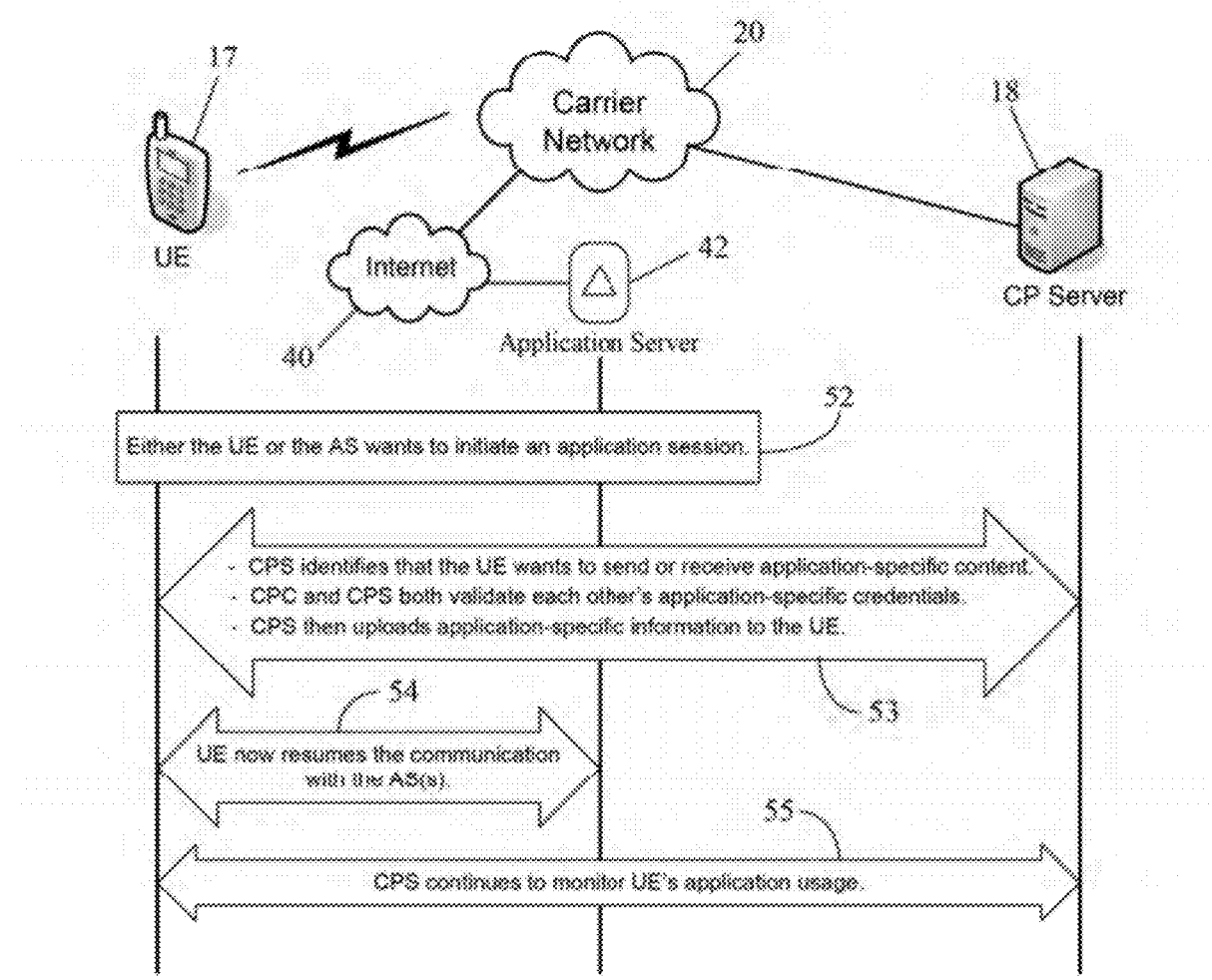
FIG. 4 relates to an exemplary sequence of interactions according to one embodiment of the present invention between the CPC and the CPS when the application execution is to be resumed at the mobile handset after the transfer as illustrated in FIG. 3.

FIG. 4 relates to an exemplary sequence of interactions according to one embodiment of the present invention between the CPC 12 and the CPS 14 when the application execution is to be resumed at the UE 17 after the transfer as illustrated in FIG. 3. In one embodiment, even when the CPS 14 is performing application-specific functionality, it may continue to monitor UE's application usage (via CPC 12) or may continue to "listen to" any messages or intimations from the CPC 12. Thus, in case of a mobile application 26 being handled by the CPS 14, when the CPC 12 finds out that the user and/or the UE 17 wishes to re-initiate an application session (e.g., when a user starts interacting with the application 26 or provide an input, or when the CPU 22 "wakes up" from an application-specific time-out session, or when the UE 17 wants to send/receive content associated with this specific application 26, etc.) or the AS 42 wishes to initiate an application session (e.g., to interact with the application 26 to provide application-specific status/data update, etc.) (block 52), the CPC 12 may inform the CPS 14 of this change in application status. Upon learning that the UE 17 wants to send/receive content associated with the application 26 or some other event has occurred that requires re-establishing application session in the UE 17, the CPS 14 may re-establish the application session in the UE 17 as indicated at event 53. In one embodiment, the CPC 12 and the CPS 14 may both validate each other's application-specific credential (described above) before the CPS 14 can upload application-specific information (e.g., the most-recent state of the application, the result of any application-specific functionality performed by the CPS 14, the execution status of the application, etc.) to the UE 17. However, it is observed here that such validation may be optional in some embodiments, in which case, uploading and/or downloading application-specific information between the CPC 12 and the CPS 14 may occur without additional validation or pre-requisites.

In one embodiment, the CPC 12 may receive the application-specific information uploaded by the CPS 14 and may provide this information to the processor 22 so that the processor 22 can integrate this information into the most-recent state of the mobile application 26 available at the UE 17 (i.e., that state which was transferred to the CPS 14 to enable it to perform application-specific functionality at event 50 in FIG. 3) and can re-commence performance of application-specific functionality (as indicated at event 54) for the mobile application 26 using that state of the mobile application 26 which has the CPS-provided information integrated therein. After transferring application processing to the UE 17, the CPS 14 continues to monitor UE's application usage as indicated at event 55 in FIG. 4 (which is similar to event 47 in FIG. 3). When the CPS 14 encounters the event 48 (FIG. 3) next time around, the process indicated by events 49 and 50 would repeat, and it may again be followed by the interactions depicted in FIG. 4. In this manner, selective transfer of application-specific functionality may take place between the UE 17 and the CP server 18 with the help of the CPC 12 and the CPS 14 components of the cloud phone application 10 according to the teachings of the present invention.

It is observed here that the order of various events or tasks illustrated in FIGS. 3 and 4 (and also in FIGS. 6 and 7 discussed later hereinbelow) is exemplary only. In different embodiments, some tasks may be aggregated, eliminated, re-arranged, or improvised depending on the processing requirements. Thus, flexible performance of various events or tasks discussed in conjunction with the present invention is contemplated hereby.

Figure 5:
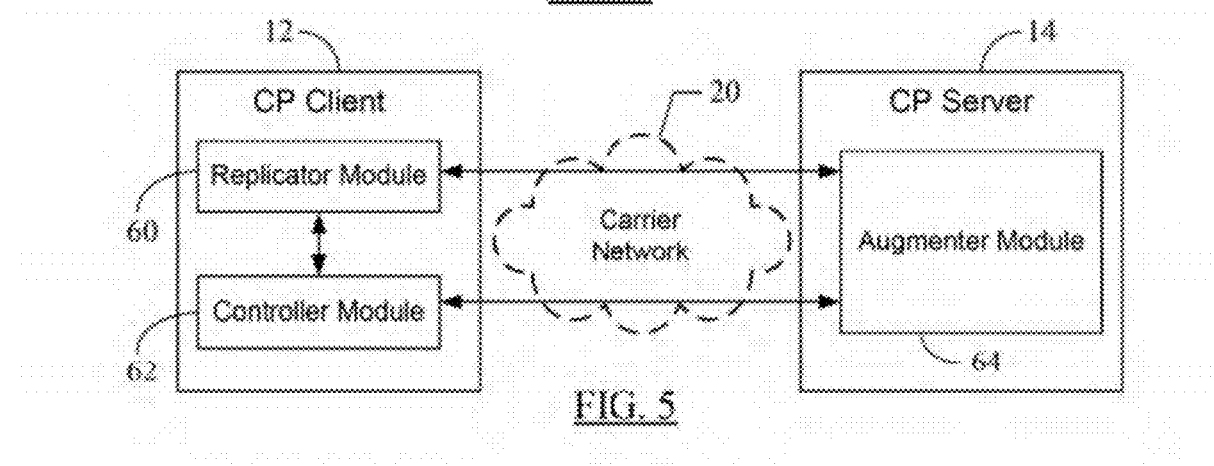
FIG. 5 is an example of program modules constituting the CPC and the CPS components of the cloud phone application, and interaction therebetween, according to one embodiment of the present invention.
Figure 6:
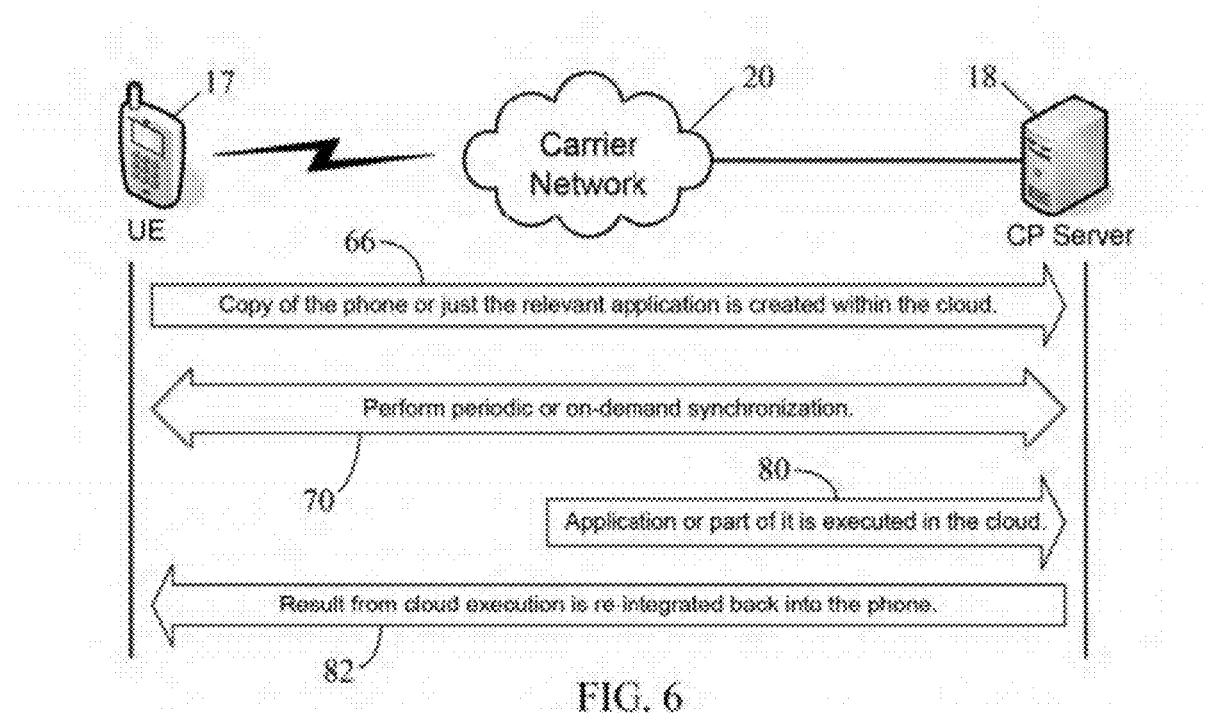
FIG. 6 shows an exemplary general sequence of events for the cloud phone application according to one embodiment of the present invention.
Figure 7:
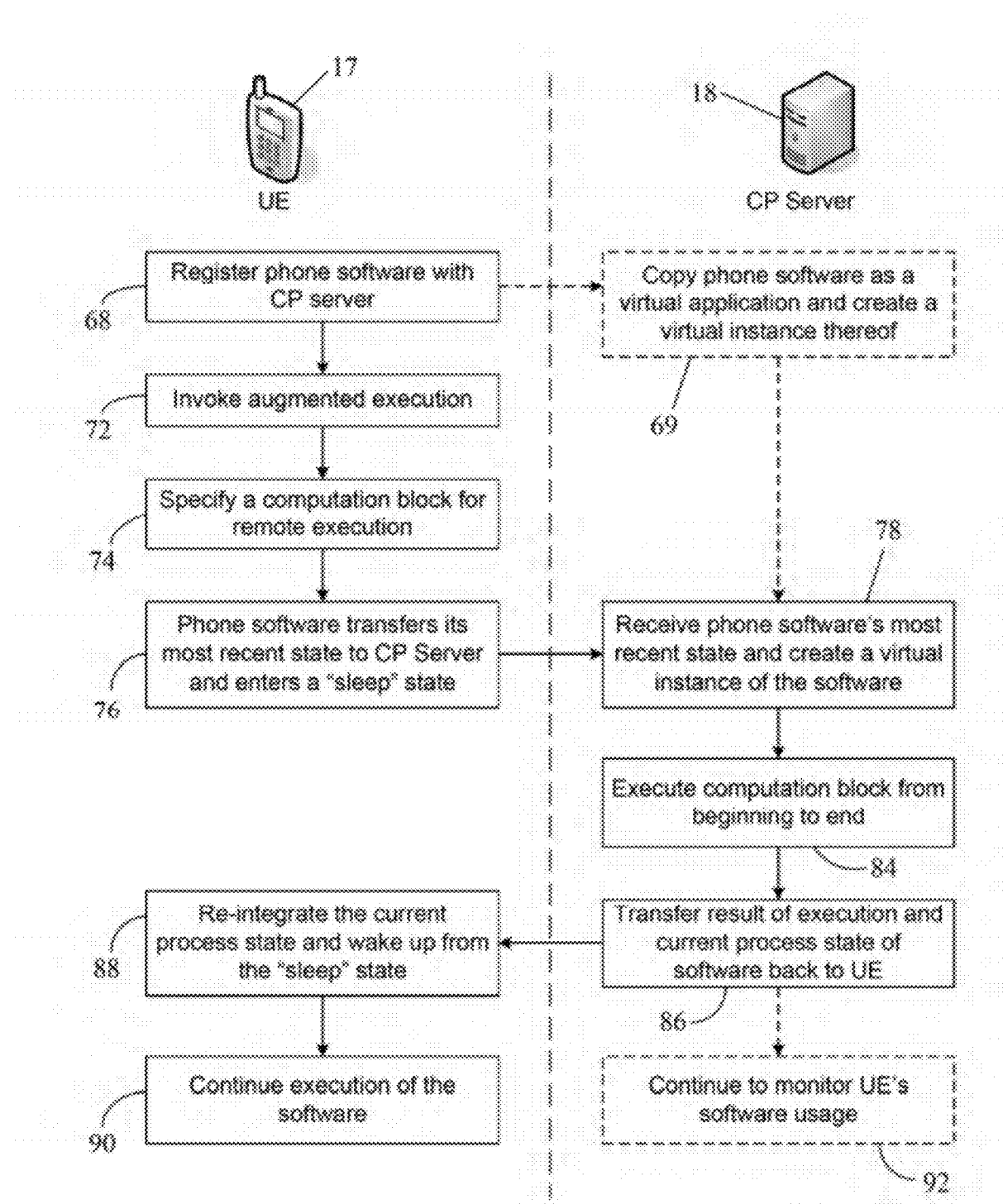
FIG. 7 is an exemplary flowchart providing additional details of various process steps for the general sequence of events illustrated in FIG. 6.

FIG. 5 is an example of program modules constituting the CPC 12 and the CPS 14 components of the cloud phone application 10, and interaction therebetween, according to one embodiment of the present invention. In one embodiment, the CPC 12 may include a replicator module 60 and a controller module 62, both in internal communication with each other and also in wireless communication with an augmenter module 64 of the CPS 14 (via the carrier network 20 as illustrated by a dotted cloud). The functionality of the modules 60, 62, and 64 may be described in conjunction with FIGS. 6 and 7, where FIG. 6 shows an exemplary general sequence of events for the cloud phone application 10 according to one embodiment of the present invention, and FIG. 7 is an exemplary flowchart providing additional details of various process steps for the general sequence of events illustrated in FIG. 6.

In the embodiment of FIG. 5, invocation of augmented execution and coordination of computation between the UE-based "primary" (i.e., the CPC 12) and the cloud-based "copy" (i.e., the CPS 14) would allow for selective transfer of application execution between the UE 16 and the CP server 18. Each of the system modules 60, 62, and 64 may be running inside its respective operating system 24 or 32 (FIG. 2). Initially, the replicator module 60 may provide a copy of all the software in the UE 17 or just a relevant mobile application 26 to the augmenter module 64 in the CPS 14, as indicated by event 66 in FIG. 6 and blocks 68 and 69 in FIG. 7. This registration process (which may also include allocation of application-specific data storage by the CPS 14) is already described above with reference to event 45 in FIG. 3 and, hence, is not repeated herein for the sake of brevity. It is noted, however, that, in an alternative embodiment, the CP server 18 may optionally obtain the copy/copies of relevant mobile applications 26 without any communication with the UE 17, as indicated by the dotted block 69 in FIG. 7. For example, if the mobile applications 26 in the UE 17 are pre-loaded by the operator of the carrier network 20, then a simultaneous phone-specific "copy" of the phone software may be created with the CP server 18. Alternatively, if a mobile application 26 is downloaded by the user of the UE 17, then the CPC 12 may identify the application and its AS 42, and the CPS 14 may access the AS 42 on its own to download a similar copy of the relevant application for its own use. In any event, regardless of the method of receipt of a copy of a UE-resident mobile application 26, the CPS 14 would treat such a copy as a "virtual" application 34 as discussed above with reference to FIG. 2.

In one embodiment, the replicator module 60 may also perform synchronization of changes in the content of the phone software (or just one or more relevant mobile applications 26) and its state with the augmenter module 64 in the "clone" entity—i.e., the CPS 14. Such synchronization may be performed periodically (e.g., at pre-determined time intervals) or on-demand (e.g., when a request for synchronization is received from the augmenter module 64) as indicated by event 70 in FIG. 6. In the embodiment of FIG. 7, this aspect of synchronization may be a part of the registration process indicated at block 68 therein. As noted earlier with reference to event 47 in FIG. 3, the CPS 14 may continue to monitor UE's application usage and may request to take over the application execution (or perform any other application-specific functionality) when it detects "non-usage" of the application by the UE 17. Such request may be sent through the augmenter module 64 to the controller module 62, which, in turn, may invoke an augmented execution (block 72, FIG. 7) at the CPS 14 and may also act to merge the results of augmented execution back to the most-recent execution state of the mobile application 26 at UE 17. At block 74, in response to invocation of augmented execution, the controller module 62 may specify a computation block (or program code or portion) (not shown) for remote execution at the CPS 14. At block 76, while coordinating the augmentation, the controller module 62 may also interact with the replicator module 60 to synchronize the most-recent state of the mobile application 26 (or any other relevant phone software) with the augmenter module 64 and then allow the mobile application process to enter a "sleep" state. The application process may transfer its most-recent state to the CPS 14 via the replicator module 60, and then enter the sleep state.

In one embodiment, as indicated at block 78, the CPS 14 may receive the phone software's most-recent state (via the augmenter module 64 that is in communication with the replicator module 60 in the CPC 12) along with an identification of the computation block that was specified for remote execution at block 74. The augmenter module 64 running the copy of the mobile application in the CP server 18 may manage local execution of the virtual application (corresponding to the UE-resident mobile application 26 or other software) at the CP server 18, and may return the result of the local execution to the "primary" entity (i.e., the CPC 12 in the UE 17) as generally indicated by events 80, 82 in FIG. 6. In one embodiment, the augmenter module 64 may supply the phone software's most recent state to a virtual machine (VM) running in the CP server 18 and related to the operating system in the UE 17. For example, in case the UE 17 uses Google's Android™ operating system platform, the CP server 18 may run Dalvik VM (not shown), which may allocate a new process state for the virtual application 34 (corresponding to the mobile application 26 at issue) and overlay what it received from the augmenter module 64 (i.e., the most-recent state of the mobile application 26) with the UE-specific hardware description translation. The VM (not shown) at the CP server 18 may execute the computation block from the beginning of the block until it reaches the end of the computation block as indicated at block 84 in FIG. 7. The result(s) of the execution may be provided to the augmenter module 64 which may, in turn, transfer the result(s) along with the final process state of the virtual application (corresponding to the mobile application 26 at issue) back to the controller module 62 in the CPC 12 at block 86.

As indicated at block 88, the controller module 62 (and, hence, the operating system 24 in the UE 17) may receive the most current process state of the mobile application 26 and re-integrate it with the process state that was earlier transferred to the augmenter module 64 at block 76. The operating system 22 may then "wake up" the mobile application 26 from its "sleep" state at block 88 and continue execution of the mobile application 26 using its re-integrated process state as indicated at block 90. It is observed here that, in one embodiment of the present invention, tasks identified with reference to blocks 72, 74, 76, 78, and 84 may be performed as part of the events 48-50 shown in FIG. 3 and already described above. Similarly, in another embodiment of the present invention, tasks identified with reference to blocks 86, 88, and 90 may be performed as part of the events 52-54 shown in FIG. 4 and also already described above.

As indicated by events 47 (FIG. 3) and 55 (FIG. 4), after the execution of the mobile application is transferred back to the UE 17, the CPS 14 may optionally return to its continued monitoring of UE's application usage as indicated by the dotted block 92 in FIG. 7.

Figure 8:
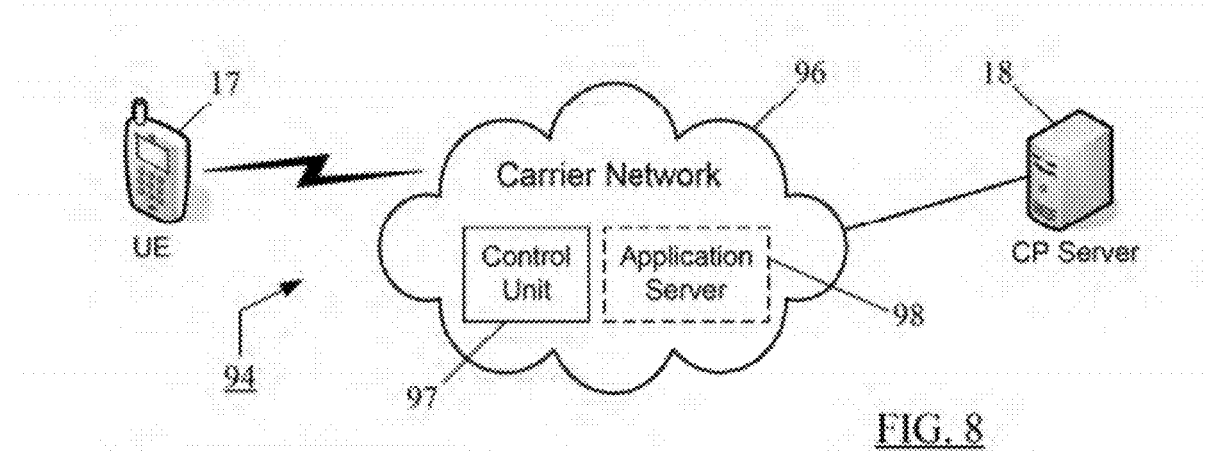
FIG. 8 illustrates an exemplary system that may be used to determine whether to transfer execution of at least a portion of a mobile application to the CPS according to one embodiment of the present invention.

FIG. 8 illustrates an exemplary system 94 that may be used to determine whether to transfer execution of at least a portion of a mobile application 26 to the CPS 14 according to one embodiment of the present invention. The system 94 may include the UE 17 (which stores the mobile application 26 whose partial execution may need to be transferred) and the CP server 18 (which carries out the partial execution of the mobile application 26 when the execution is transferred thereto). In addition, the system may include a carrier network 96 facilitating wireless communication between the mobile handset 17 and the CP server 18. As in the case of the configuration in FIG. 2, the CP server 18 may be coupled to the carrier network 96 via a wired or wireless connection (whether circuit-switched or packet-switched). The carrier network 96 may be substantially similar to the carrier network 20 and, hence, a more detailed discussion of the carrier network 96 is not provided herein for the sake of brevity. However it is observed here that, in the embodiment of FIG. 8, the carrier network 96 is shown to also include a control unit 97 configured to determine (as discussed below) whether execution of a portion of the mobile application 26 (resident in the UE 17) should be transferred from the mobile handset 17 to the CP server 18. In one embodiment, the carrier network 96 may also optionally include an application server 98 as part thereof as indicated by a dotted block in FIG. 8. The application server 98 may be similar in functionality to the AS 42 discussed above with reference to FIG. 2 and, hence, is not described in further detail here. However, it is observed here that carrier network 96 may include such an application server 98 as part of the network itself when, for example, the operator of the network 96 provides or support one or more mobile applications 26 in the handset 17 (e.g., by pre-loading the applications 26 into the UE 17 before the UE 17 is purchased by a subscriber). Similarly, although not shown in FIG. 8, in one embodiment, the CP server 18 may also be a part of the carrier network 96 either as a separate physical entity or as part of another entity or software implementing the functionality of the CP server 18. In one embodiment, the functionalities of the control unit 97 and, optionally, the application server 98 and/or the CP server 18 may be implemented or integrated (with one or more existing devices) in the core (not shown) of the carrier network 96.

A mobile application may be selected for distributed processing using the cloud phone application 10 (FIG. 1) based on user experience. The user experience ("UX") may be related to the product of (i) battery, computation, and memory power of the UE 17 ("F(limits)") and (ii) the session bandwidth ("B/W") available on the carrier network 20. In one embodiment, to improve the UX, the control unit 97 may be configured to make a policy decision for off-loading the partial execution of the mobile application 26 to the CP server 18 based on control unit's estimation of net savings in energy consumption of the mobile handset 17 running the specific mobile application 26. The control unit 97 may process a combination of application-specific, UE-specific, and CP server-specific information to determine whether to transfer execution of a portion of the mobile application 26 from the UE 17 to the CP server 18. For example, in one embodiment, the control unit 97 may be configured to determine that execution of at least a portion of the mobile application 26 be transferred from the mobile handset 17 to the more-powerful remote processor 30 in the CP server 18 when the control unit 97 concludes that the following inequality holds true:

$$(Pm \times C/M) > (Pidle \times C/S) + (Ptrx \times D/B) \quad (1)$$

where,

C=number of instructions required to be executed for the mobile application 26, M=instruction execution speed (in number of instructions per second) of the mobile handset 17 (i.e., the processor 22 in the mobile handset 17), S=instruction execution speed (in number of instructions per second) of the CP server 18 (i.e., the processor 30 in the CP server 18), D=data bytes related to the mobile application 26 to be exchanged between the mobile handset 17 and the CP server 18 when execution of at least a portion of the mobile application 26 is transferred from the mobile handset 17 to the CP server 18, B=wireless byte transfer speed (in total number of uplink and downlink bytes exchanged per second) during wireless communication between the CP server 18 and the mobile handset 17, Pm=power consumption in watt/second while the mobile handset 17 is in an active state (which may include local processing at the mobile handset 17, but may not include transmission/reception with the carrier network 96), Pidle=power consumption in watt/second while the mobile handset 17 is in an idle state, and Ptrx=power consumption in watt/second while the mobile handset 17 wirelessly communicates with the CP server 18.

It is noted here that values of some of the parameters above (e.g., Pidle, or M) may be already known. Whereas values of various other parameters in inequality (1) above may be obtained by the control unit 97 from communication with other units (not shown) in the carrier network 96 (e.g., the application server 98 for parameter "C") as well as from its communication with the UE 17 and the CP server 18 when needed. If values for all parameters are not available, the control unit 97 may still provide a reasonable estimation (as discussed below with reference to a pair of examples) of the truthfulness or falsity of inequality (1). In one embodiment, the control unit 97 may employ program logic to perform the necessary estimation.

The control unit 97 may evaluate (or estimate) the energy sensitivity of the mobile handset 17 based on different bottleneck points. For example, a mobile game of chess or a face recognition application in the mobile handset 17 may be considered Markovian in nature (i.e., a stochastic process having the property of a Markov process) and, hence, may be fully expressed by its current state. In such a game of chess, the amount of computation "C" may be very large and may even be parallelized depending on the player's move (thereby further increasing the amount of computation "C"). On the other hand, the value of "D" may be very small for the game of chess. Thus, in the active state, there may be significant energy consumption ("Pm") in the mobile handset 17 because of the heavy usage of the processor 22 to perform extremely large computations "C." Hence, the inequality (1) may hold "true" in this example of mobile game of chess and, hence, the control unit 97 may determine that it is beneficial to offload at least a part of execution of this mobile chess application to the CP server 18 to save energy at the mobile handset 17.

However, contrary to the mobile chess and/or face recognition applications discussed above, in a second example of an image retrieval application that retrieves images from different online sources or from the memory (not shown) in the UE 17, the inequality (1) may not hold true. The program may retrieve images by comparing numerical representations of the images. These features (or numerical representations) for the image collection can be computed in advance, in which case the value of parameter "C" may be quite small at run time. On the other hand, the value of "D" may be large due to considerable image-related data to be sent. Thus, even if S>>M, the value of the ratio D/B might still be too large when compared with the value of the ratio C/M in case of this image retrieval application. Thus, the inequality (1) may not hold true. A decision to offload at least partial execution of this image retrieval application to the CP server 18 may save energy at the UE 17 only if the value of "B" is very large (at high bandwidths).

From the above discussion, it may imply that in a high bandwidth ("B") system where the computed ratio S/M is high (i.e., S>>M), it may be desirable to offload partial processing of most of the mobile applications onto the CP server 18. Such a requirement may be fulfilled in case of an LTE (Long Term Evolution) network-based smartphone. However, it still may be desirable to reduce the value of the ratio D/B to increase the attractiveness of the offload. In one embodiment, this issue is addressed by exploiting the key difference between a client-server model (in which the server does not already contain the data, but rather all the data must be sent to the service provider's server) and a cloud computing model (in which data is already stored in the cloud (e.g., a carrier network or a cloud-based device like the CP server 18) and a cloud-based device (e.g., the CP server 18) performs computations on that data). In such a cloud-based arrangement, there no longer may be a need to send the mobile application-specific data over the wireless network (e.g., the carrier network 96). Rather, it may be sufficient for the CPC 12 (in the UE 17) to just send a pointer to the relevant data to the CPS 14 (in the CP server 18). A very small "D" and a very large "B" in such a cloud-based implementation (e.g., the system 16 in FIG. 2 or the system 94 in FIG. 8) may render the inequality (1) above as "true," thereby implying that energy can always be saved at the UE 17 from offloading to CP server 18.

This data pointer efficiency may not be available for realtime data, where "D" may no longer be a pointer to the data, but may rather refer to the actual data (e.g., in case of mobile surveillance or context-aware navigation). As mentioned before, when the value of "D" is large, offloading may not save energy (at UE 17). In that situation, partitioning of computation between the mobile handset 17 and the CP server 18 may be desirable to reduce energy consumption at the mobile handset 17. Such automatic or semi-automatic partitioning may be considered a "fractional offload", which may contain a subset of the "C" instructions and which may still provide some incremental value to energy savings. In one embodiment, the present invention may combine whole-system replication with incremental check-pointing and (semi-) automatic partitioning to explore design space of different mobile system architectures. Furthermore, invocation of augmented execution and coordination of computation between the primary (i.e., the mobile handset 17) and the cloud copy (at the CP server 18) for a mobile application 26 may contribute to significant energy savings at the mobile handset 17 and reduced pressure on the network traffic.

In one embodiment, the control unit 97 may improve its policy decision (of whether to offload or not) by considering whether the user of the mobile handset 17 is close to a home or office. In other words, location-tracking may be integrated with the data/computation offload decision. The control unit 97 may receive handset-tracking data from various controllers in the carrier network 96. If a user is close to a home or office, the control unit 97 may safely "assume" that the user's mobile handset 17 has easy access to a charging source (e.g., an electrical outlet) for its battery (not shown). However, if the user is not at either location (or is at any other location deemed not "easy" to charge the user's handset 17), then control unit 97 may determine that execution of at least a portion of the mobile application 26 running on the user's handset 17 be transferred from the user's handset 17 to the CP server 18. In this situation, offload (of processing of application-specific functionality) may occur at higher rate to conserve energy at the UE 17.

Figure 9:
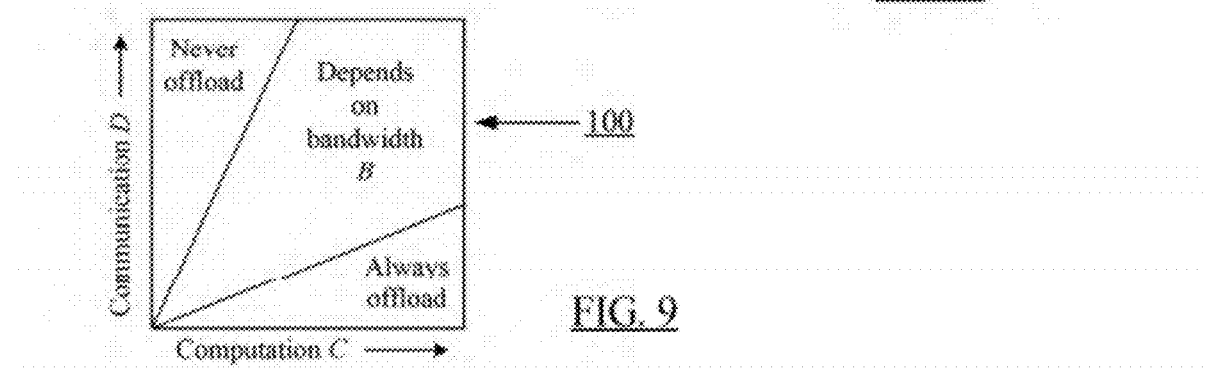
FIG. 9 is an exemplary graphical depiction of decision-making regarding whether to transfer execution of at least a portion of a mobile application to the CPS according to one embodiment of the present invention.

FIG. 9 is an exemplary graphical depiction 100 of decision-making regarding whether to transfer execution of at least a portion of a mobile application 26 to the CPS 14 according to one embodiment of the present invention. As shown in graph 100 and as discussed above, in case of very high values of parameter "C" (requiring extremely large computations at UE 17) and significantly lower values of parameter "D", it may be desirable to always offload execution of at least a portion of the mobile application 26. On the other hand, in case of very high values of parameter "D," but significantly lower values of parameter "C," it may not be desirable to perform any offloading. Between these extremes, the decision to offload may depend on the value of the bandwidth parameter "B" as discussed above in more detail.

It is noted here that, in one embodiment, when the control unit 97 determines that transfer of execution of at least a portion of the mobile application 26 from the UE 17 to the CP server 18 is desirable, then the CPC 12 and the CPS 14 components of the cloud phone application 10 may interact in the manner discussed above with reference to various embodiments in FIGS. 3 through 7 to carry out the selective transfer of execution.

Figure 10:
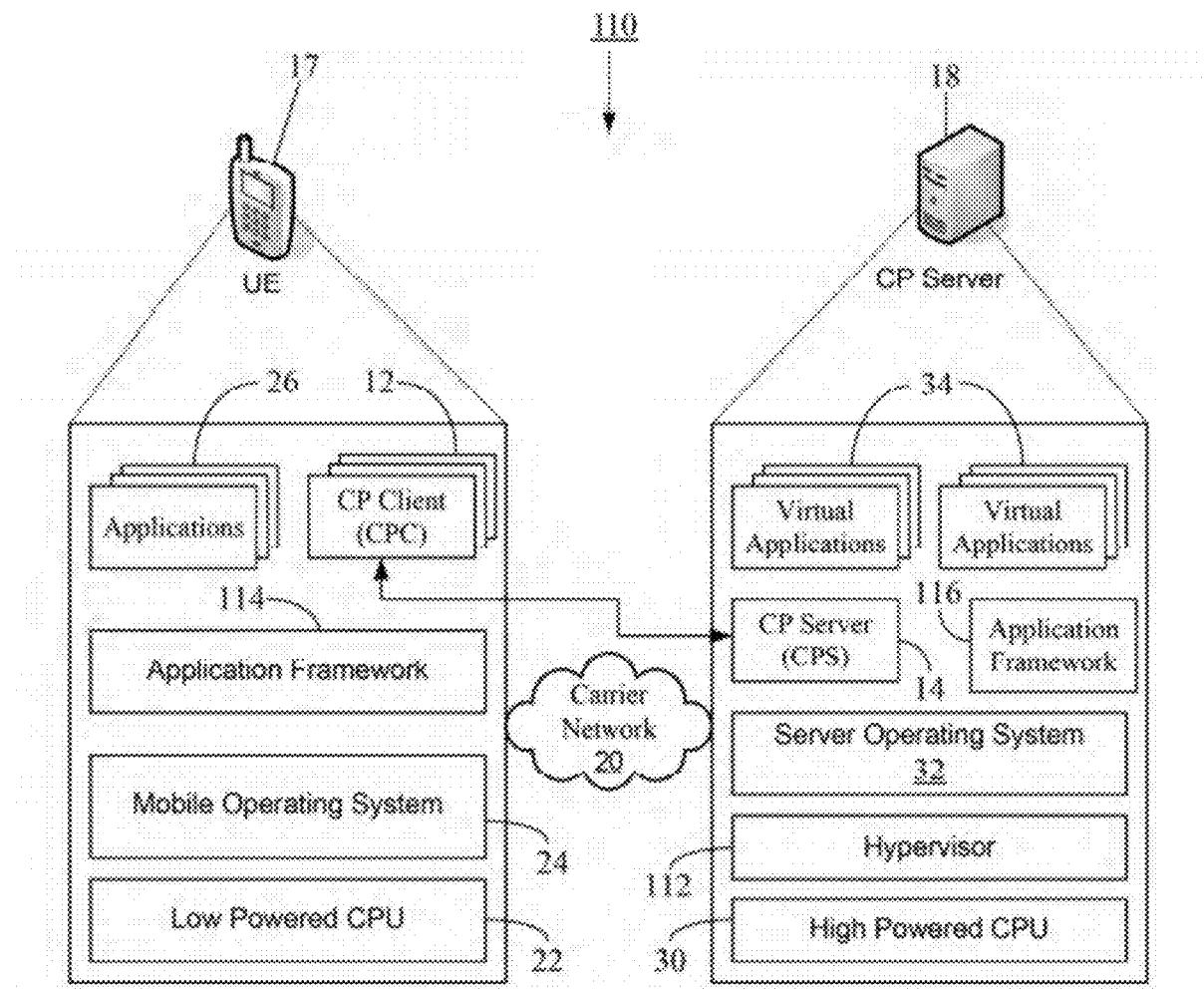
FIG. 10 depicts an exemplary system for implementing the cloud phone (CP) application according to one embodiment of the present invention.

FIG. 10 depicts an exemplary system 110 for implementing the cloud phone (CP) application 10 (FIG. 1) according to one embodiment of the present invention. The system 110 in FIG. 10 provides additional cloud computing-based architectural details for the system 16 shown in FIG. 2, while omitting depiction of certain elements (e.g., the application server 42, the Internet 40, etc.) for the sake of clarity. The elements shown in FIG. 10 and discussed hereinbefore are not discussed further for the sake of brevity. It is observed here, however, that the low-powered mobile CPU 22 may be an ARM (Advanced RISC (Reduced Instruction Set Computer) Machine) CPU, whereas the high-powered server CPU 30 may be a suitable Intel® x86-based CPU. In FIG. 10, usage of virtualization allows different client applications 26 to run on different virtual machines (not shown). These virtual machines may be managed by a virtualization layer in the CP server 18. In one embodiment, this virtualization layer may include a hypervisor 116 such as, for example, the VMware® Hypervisor, or the Citrix® XEN Server, etc. Application frameworks 114, 116 may provide software frameworks to implement standard structures of UE-specific applications 26 into the virtualization environment at the CP server 18. FIG. 10 also illustrates various instances of the CPC component 12 (corresponding to various mobile applications running on the UE 17) in communication with the CPS 14 (which may be considered as a "cloudlet" in the cloud-based implementation of the cloud phone application 10). In one embodiment, as part of implementation of the architecture shown in FIG. 10, an HLD (High Level Design) may be prepared identifying hypervisor components and virtualization client components. Furthermore, a messaging interface between virtualization client (i.e., the CPC 12) and cloudlet (i.e., the CPS 14) also may be defined to implement functions of the cloud phone application 10 according to the teachings of the present invention.

The foregoing describes a system and method that offers a long-term solution to address the growing demands of modern mobile applications on handset processing power and network communication resources, without the need to place any usage or monetary restrictions on the users of mobile handsets and without sacrificing advanced functionalities afforded by the applications. The present invention provides a cloud phone approach in which application-specific functionality is transferred from a mobile handset to the carrier network. The network component of the cloud phone would communicate with a virtual copy of the handset-resident application on behalf of the handset while the handset is in a "dormant" state (i.e., when the handset is not actively using the application) and would perform any necessary application execution on behalf of the handset, relieving the handset from continuously using its processor (and, hence, energy) resources. However, the network component of the cloud phone would transfer the application session back to the handset as soon as the handset starts to actively use the application again. The cloud phone approach also reduces pressure on network's radio link capacity by selectively moving execution of "chatty" applications from the mobile handset to the network-based component of the cloud phone. The cloud phone approach can be implemented without significant disruption to existing architecture or functionality of the mobile network, and without the need to rely on more processing power from mobile handsets whenever newer, more-sophisticated applications appear on the horizon. The selective transfer of application-specific functionality from the mobile handset to the carrier network allows the network operators to offer rich graphic- and multimedia-based contents to its mobile users without placing any restrictions on their usage.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of transferring application-specific functionality from a mobile handset to a wireless network associated with the mobile handset, the method comprising the steps of:
   creating only a virtual instance of a mobile application using a network-based processor that is in wireless communication with the mobile handset via the wireless network, wherein the mobile application resides in the mobile handset and is configured to be executed thereby;
   using the network-based processor, monitoring usage of the mobile application in the mobile handset; and
   upon detecting absence of a first active usage of the mobile application in the mobile handset, performing, using the network-based processor, application-specific functionality on behalf of the mobile handset for the mobile application using the virtual instance thereof,
   upon detecting that a second active usage of the mobile application in the mobile handset has been initiated, discontinuing performance using the network-based processor of the application-specific functionality for the mobile application.

2. The method of claim 1, wherein creating the virtual instance includes one or more of the following:
   creating a handset-specific copy of the mobile application being executed by the mobile handset;
   replicating functionality of the mobile handset; and
   allocating application-specific data storage in the network for the mobile application.

3. The method of claim 1, wherein performing the application-specific functionality includes one or more of the following:
   copying application-specific contextual information for the mobile application from the mobile handset;
   executing at least a portion of the mobile application; and
   communicating with an application server associated with the mobile application.

4. The method of claim 1, further comprising performing the following using the network-based processor prior to performing the application-specific functionality:
   instructing the mobile handset to stop communicating with an application server associated with the mobile application.

5. The method of claim 1, further comprising:
   sending a result from performance of the application-specific functionality for the mobile application back to the mobile handset using the network-based processor.

6. The method of claim 5, further comprising:
   using the network-based processor, validating at least one application-specific credential of the mobile handset for the mobile application prior to performing the application-specific functionality and prior to sending the result.

7. An arrangement in a telecommunication network in wireless communication with a mobile handset, the arrangement configured to transfer application-specific functionality from the mobile handset to the network, the arrangement comprising:
   a network-based memory configured to store in the network, only a virtual instance of a mobile application that resides in and is executed by the mobile handset; and
   a network-based processor coupled to the memory, wherein the network-based processor is configured to:
      monitor usage of the mobile application in the mobile handset; and
      detect an absence of a first active usage of the mobile application in the mobile handset; and
      upon detecting the absence of the first active usage of the mobile application in the mobile handset, perform application-specific functionality on behalf of the mobile handset for the mobile application using the virtual instance thereof,
      upon detecting that a second active usage of the mobile application in the mobile handset has been initiated, discontinue performance of the application-specific functionality for the mobile application.

8. The arrangement of claim 7, wherein the virtual instance of the mobile application includes one or more of the following:
   a handset-specific copy of the mobile application being executed by the mobile handset; and
   logic replicating functionality of the mobile handset.

9. The arrangement of claim 7, wherein the network-based processor is configured to perform the application-specific functionality on behalf of the mobile handset by performing one or more of the following:
   copying application-specific contextual information for the mobile application from the mobile handset;
   executing at least a portion of the mobile application; and
   communicating with an application server associated with the mobile application.

10. The arrangement of claim 7, wherein upon detecting the absence of the first active usage of the mobile application in the mobile handset, the network-based processor is further configured to instruct the mobile handset to stop communicating with an application server associated with the mobile application.

11. The arrangement of claim 7, wherein after performing the application-specific functionality on behalf of the mobile handset, the network-based processor is further configured to send a result from performance of the application-specific functionality to the mobile handset.

12. The arrangement of claim 11, wherein the network-based processor is further configured to validate at least one application-specific credential of the mobile handset for the mobile application prior to performing the application-specific functionality and prior to sending the result.

* * * * *